R. WALKER.
LEVEL.
APPLICATION FILED MAY 27, 1919.

1,380,611.  Patented June 7, 1921.

INVENTOR
ROBERT WALKER

UNITED STATES PATENT OFFICE.

ROBERT WALKER, OF TORONTO, ONTARIO, CANADA.

LEVEL.

1,380,611.      Specification of Letters Patent.      Patented June 7, 1921.

Application filed May 27, 1919. Serial No. 300,066.

*To all whom it may concern:*

Be it known that I, ROBERT WALKER, of the city of Toronto, in the county of York, in the Province of Ontario, Canada, have invented certain new and useful Improvements in Levels, of which the following is the specification.

My invention relates to improvements in levels and the object of the invention is to devise a level which may be readily readable no matter in what position it is placed and it consists essentially of the arrangement and construction of parts as hereinafter more particularly explained.

In the drawings like characters of reference indicate corresponding parts in the various figures.

Figure 1:
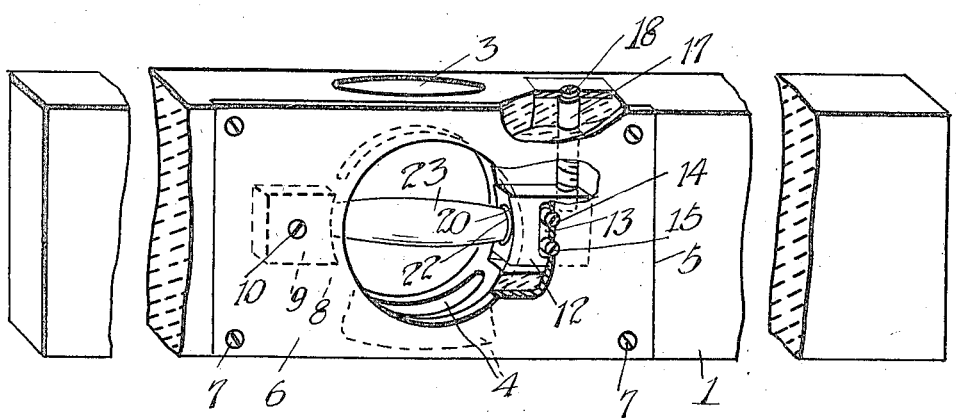
Figure 1, is a perspective view of a level intermediately broken away of its length.
Figure 2:
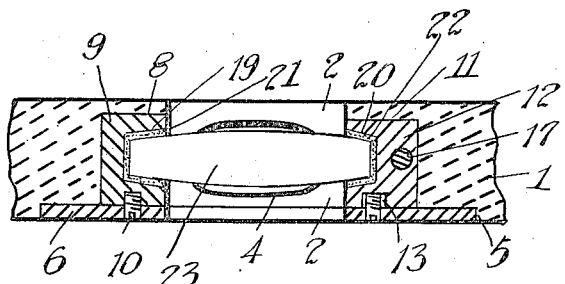
Fig. 2, is a sectional plan view of the central portion of the level.

1 indicates the level body which is provided with a central circular orifice 2 and orifices 3 and 4 extending through the level body at right angles to the orifice 2. One face of the level body is recessed at 5, such recess being adapted to receive a face plate 6, which is secured in position by a screw 7. 8 indicates a recess formed in the level body on one side of the orifice 2. 9 indicates a block which is located within the recess 8 and which is turnably secured in position by a set screw 10 extending through the face plate 6 into the block 9. 11 indicates a recess formed in the diametrically opposite side of the orifice 2. 12 indicates a block located in such recess, such block being provided in the face adjacent to the face plate 6 with a slotted recess 13. 14 and 15 indicate set screws which extend through the face plate 6 into the slotted recess 13. 16 indicates a plate which is recessed into the upper edge of the level body. 17 indicates a screw which extends downwardly into the block 12 and is provided at its upper end with a shoulder 18 bearing against the lower face of the plate 16.

By turning the screw 17 the block 12 may be adjusted in a vertical direction. The blocks 9 and 12 are provided with opposing recesses 19 and 20 preferably provided with cushion linings 21 and 22.

23 indicates a level glass which is tapered equally at all sides toward its ends, such tapered ends fitting within the cushion recesses 19 and 20. By means of the glass being equally tapered on all sides it will be readily understood that no matter in what position the level is held it will readily indicate the desired angle.

What I claim as my invention is.

1. In a level, the combination with the level body having sighting orifices extending inwardly at the center of the level from all sides and a level glass tapered toward its ends, a block turnably supported within the level body having a level glass receiving recess into which one end of the level glass fits, an adjustable block carried in the level body at the opposite side of the sighting orifices having a level glass receiving recess into which the opposite end of the level glass fits, and means for adjusting the block within the level body.

2. In a level, the combination with the level body having sighting orifices extending inwardly at the center of the level from all sides and a level glass tapered toward its ends, a block turnably supported within the level body having a level glass receiving recess into which one end of the level glass fits, an adjustable block carried in the level body at the opposite side of the sighting orifices having a level glass receiving recess into which the opposite end of the level glass fits, and a set screw turnably held within the level body and extending into the adjustable block.

ROBERT WALKER.

Witnesses:
M. EGAN,
H. HEBDEN.